US012072250B2

(12) United States Patent
Matsumoto et al.

(10) Patent No.: US 12,072,250 B2
(45) Date of Patent: Aug. 27, 2024

(54) THIN FILM SENSOR

(71) Applicants: HONDA MOTOR CO., LTD., Tokyo (JP); GOTOH EDUCATIONAL CORPORATION, Tokyo (JP)

(72) Inventors: Kenji Matsumoto, Saitama (JP); Yuji Mihara, Tokyo (JP)

(73) Assignees: HONDA MOTOR CO., LTD., Tokyo (JP); GOTOH EDUCATIONAL CORPORATION, Tokyo (JP)

( * ) Notice: Subject to any disclaimer, the term of this patent is extended or adjusted under 35 U.S.C. 154(b) by 109 days.

(21) Appl. No.: 17/709,435

(22) Filed: Mar. 31, 2022

(65) Prior Publication Data

US 2022/0316963 A1    Oct. 6, 2022

(30) Foreign Application Priority Data

Mar. 31, 2021   (JP) .................. 2021-061843

(51) Int. Cl.
*G01L 1/00*     (2006.01)
*G01K 13/08*    (2006.01)

(52) U.S. Cl.
CPC .............. *G01L 1/005* (2013.01); *G01K 13/08* (2013.01)

(58) Field of Classification Search
CPC .................. G01L 1/005; G01K 13/08

USPC ........................................... 73/458
See application file for complete search history.

(56) References Cited

U.S. PATENT DOCUMENTS

| | | | |
|---|---|---|---|
| 10,866,203 B2 * | 12/2020 | Kobayashi ............. | G01N 27/12 |
| 2015/0122038 A1 * | 5/2015 | Mayer ................... | G01L 19/146 |
| | | | 29/874 |
| 2016/0103031 A1 * | 4/2016 | Tham .................... | C04B 35/653 |
| | | | 264/497 |
| 2018/0162722 A1 * | 6/2018 | Male ..................... | B81B 7/0048 |

FOREIGN PATENT DOCUMENTS

| JP | H054464 A | 1/1993 |
|---|---|---|
| JP | 2008196956 A | 8/2008 |

* cited by examiner

*Primary Examiner* — Nathaniel T Woodward
(74) *Attorney, Agent, or Firm* — CKC & Partners Co., LLC

(57) ABSTRACT

A thin film sensor includes an insulating layer provided on a surface of a measurement target, and a sensor layer that is laminated on the insulating layer, and includes a plurality of regions partitioned by a groove that is provided by irradiation of a laser and penetrates in a thickness direction. Among the plurality of regions, at least one region corresponds to a sensor region that senses a pressure applied to the measurement target or a temperature of the measurement target, and other regions each correspond to a non-sensor region that does not sense a pressure applied to the measurement target or a temperature of the measurement target.

3 Claims, 5 Drawing Sheets

THIN FILM SENSOR

This application is based on and claims the benefit of priority from Japanese Patent Application No. 2021-061843, filed on 31 Mar. 2021, the content of which is incorporated herein by reference.

BACKGROUND OF THE INVENTION

Field of the Invention

The present invention relates to a thin film sensor.

Related Art

Conventionally, when a thin film sensor is manufactured directly on a planar installation surface, lithography for transferring predetermined patterns onto the installation surface has been used (for example, Japanese Unexamined Patent Application, Publication No. H05-4464). In this lithography, exposure is performed by irradiating a resist layer with light through a mask on which a pattern is drawn, and then the exposed resist layer is developed to form a predetermined pattern on the installation surface.

The installation surface on which the thin film sensor is installed is not limited to a plane, and may be a curved surface. Japanese Unexamined Patent Application, Publication No 2008-196956 discloses manufacturing a sensor directly on a curved surface (an inner peripheral surface of an outer ring of a bearing) using lithography. In this case as well, similarly to the case where the installation surface is a plane, light is irradiated through the mask.

Patent Document 1: Japanese Unexamined Patent Application, Publication No. H05-4464
Patent Document 2: Japanese Unexamined Patent Application, Publication No. 2008-196956

SUMMARY OF THE INVENTION

When a sensor is manufactured directly on a curved surface, it is necessary to align the mask along the curved surface. However, in this case, it is necessary for the mask to be provided along the curved surface with high accuracy, and it is not easy to achieve the masking with high accuracy. This is remarkable particularly in the case where the diameter of the curved surface is small. In addition, it is difficult to fix the mask to a recessed portion.

It is an object of the present invention to provide a thin film sensor which can be easily manufactured directly even on a curved surface or in a recessed portion.

(1) According to a first aspect of the invention, a thin film sensor includes: an insulating layer provided on a surface of a measurement target; and a sensor layer that is laminated on the insulating layer, and includes a plurality of regions partitioned by a groove that is provided by irradiation of a laser and penetrates in a thickness direction. Among the plurality of regions, at least one region corresponds to a sensor region that senses a pressure applied to the measurement target or a temperature of the measurement target, and other regions each correspond to a non-sensor region that does not sense a pressure applied to the measurement target or a temperature of the measurement target.

(2) According to a second aspect of the invention, in (1) above, the groove may be provided by irradiating a surface of the sensor layer with a laser beam of picosecond or less.

(3) According to a third aspect of the invention, in (1) above, the groove may be provided by irradiating a surface of the sensor layer with a laser beam with the surface of the sensor layer cooled.

According to the present invention, it is possible to provide a thin film sensor which can be easily manufactured directly even on a curved surface or in a recessed portion.

DETAILED DESCRIPTION OF THE INVENTION

Hereinafter, specific embodiments of the present invention will be described in detail with reference to the drawings.

Figure 1:
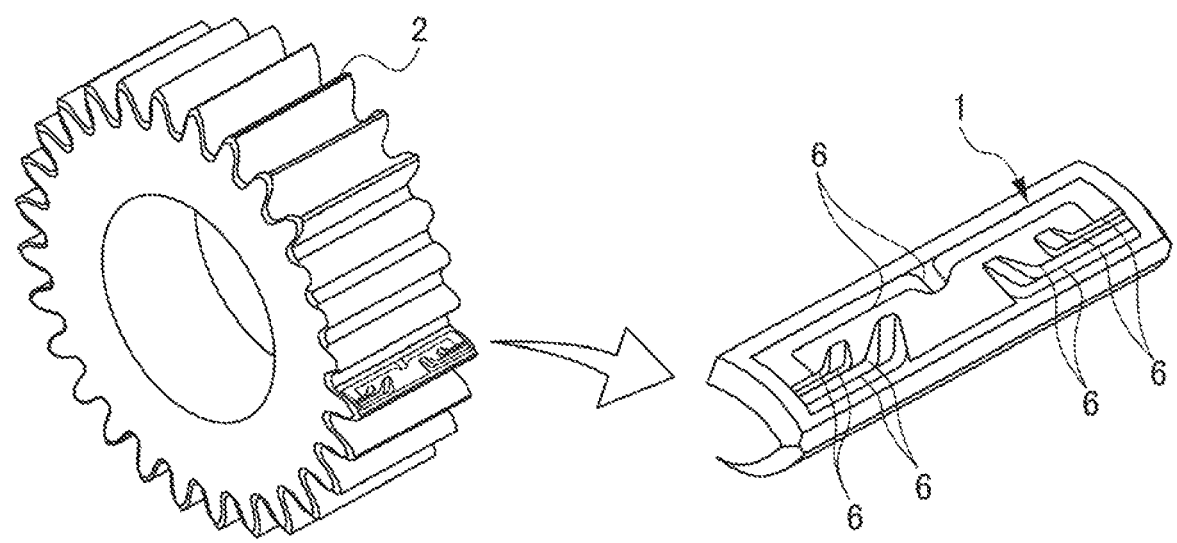
FIG. 1 is a schematic perspective view showing a use state of a thin film sensor according to a first embodiment of the present invention.
Figure 2:
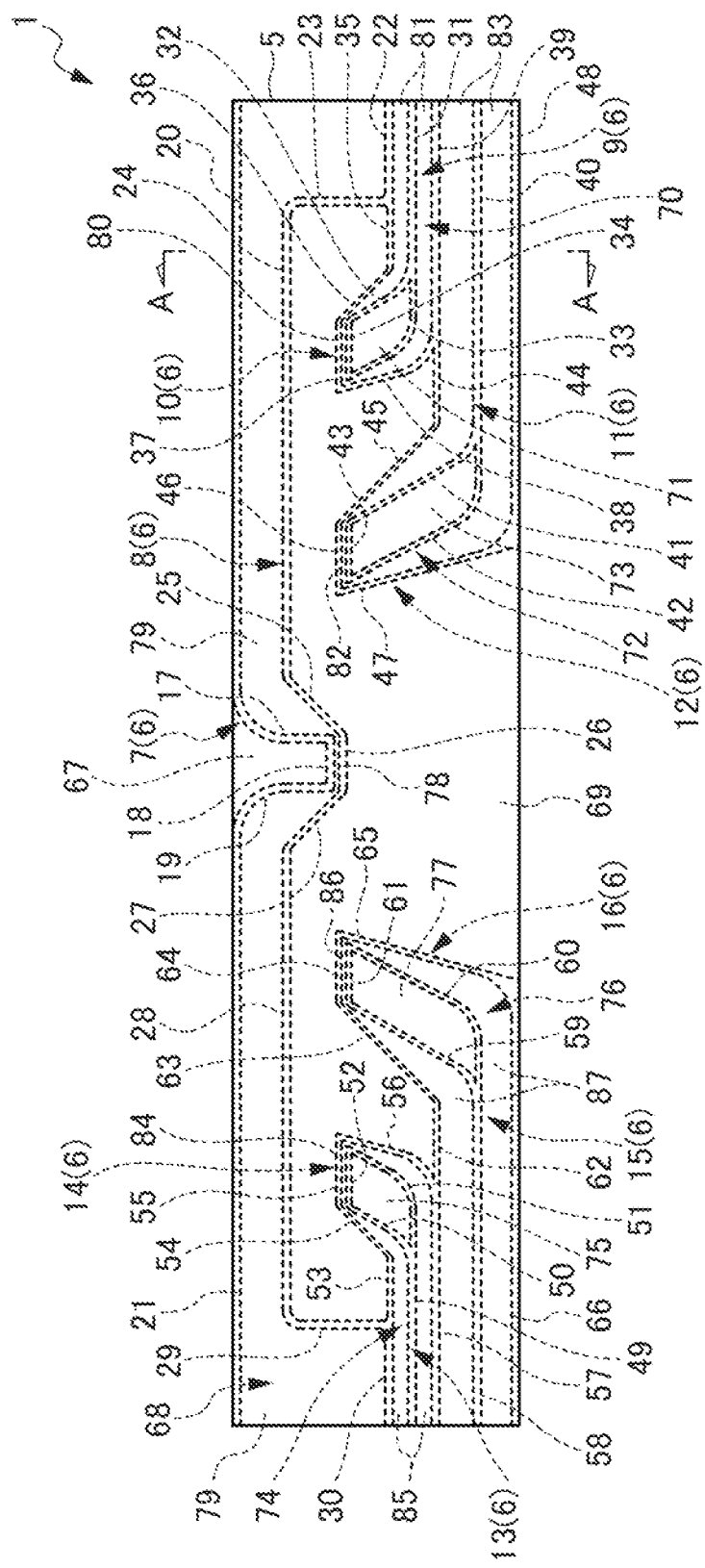
FIG. 2 is a schematic top view showing the thin film sensor of FIG. 1.
Figure 3:
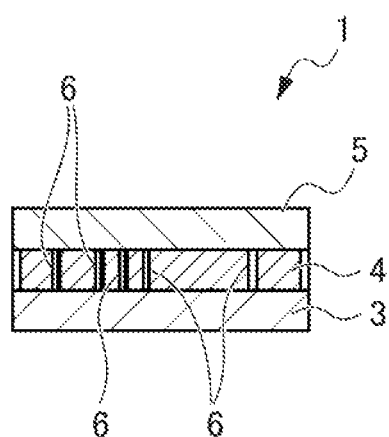
FIG. 3 is a cross-sectional view taken along the line A-A in FIG. 2.

FIGS. 1 to 3 are diagrams showing a thin film sensor according to a first embodiment of the present invention. FIG. 1 is a schematic perspective view showing a state of the thin film sensor being used. FIG. 2 is a schematic top view. FIG. 3 is a cross-sectional view taken along the line A-A in FIG. 2. It should be noted that, in FIG. 1, a portion of the teeth of the gear is cut off for convenience of explanation.

A thin film sensor 1 of the first embodiment includes an insulating layer 3 provided on the surface of a measurement target 2, a sensor layer 4 laminated on the insulating layer 3, and a protective layer 5 laminated on the sensor layer 4. The thin film sensor 1 serves as a pressure sensor that detects pressure applied to the measurement target 2. Here, for example, the measurement target 2 is a gear, and the thin film sensor 1 is provided on the tooth surface of the gear. It should be noted that the measurement target 2 is not limited to a gear.

The insulating layer 3 has a substantially rectangular plate shape in a top view, and is provided on one tooth surface of the gear 2. At this time, the insulating layer 3 is provided on the tooth surface so that the longitudinal direction is along the tooth width direction. Upon providing the insulating layer 3 on the tooth surface, for example, sputtering is used. It should be noted that the insulating layer 3 may be made of an insulating material such as alumina, ceramic, or glass.

The sensor layer 4 has a substantially rectangular plate shape in a top view, and is provided on the insulating layer 3. At this time, the sensor layer 4 is provided on the insulating layer 3 so that the longitudinal direction of the sensor layer 4 is along the longitudinal direction of the insulating layer 3. Upon providing the sensor layer 4 on the insulating layer 3, for example, sputtering is used. The sensor layer 4 is made of copper manganese nickel alloy, copper nickel alloy, or nickel chromium alloy, for example.

The sensor layer 4 has a plurality of regions partitioned by grooves 6. The grooves 6 penetrate in the thickness direction by irradiation of the laser. At least one among the plurality of regions is a sensor region that senses the pressure applied to the tooth surface of the gear 2, and the other regions are each a non-sensor region that does not sense the pressure applied to the tooth surface of the gear 2. In the first embodiment, a plurality of grooves 7 to 16 are provided in the sensor layer 4. The grooves 7 to 16 are provided to extend through the sensor layer 4 in the thickness direction so that the insulating layer 3 serves as a bottom portion.

The groove 7 is provided in the middle of the sensor layer 4 in the longitudinal direction and on one side of the sensor layer 4 in the lateral direction. The groove 7 includes a first groove portion 17, a second groove portion 18, and a third groove portion 19. The first groove portion 17 extends from one end portion in the lateral direction of the sensor layer 4 toward the other end portion in the lateral direction of the sensor layer 4. The second groove portion 18 extends from the other end portion of the first groove portion 17 in the lateral direction of the sensor layer 4 toward the other end portion of the sensor layer 4 in the longitudinal direction. The third groove portion 19 extends from the other end portion of the second groove portion 18 in the longitudinal direction of the sensor layer 4 toward one end portion in the lateral direction of the sensor layer 4. The one end portion of the first groove portion 17 in the lateral direction of the sensor layer 4 and the one end portion of the third groove portion 19 in the lateral direction of the sensor layer 4 are each provided in a substantially arc shape such that the distance therebetween gradually becomes larger as approaching the one end portion in the lateral direction of the sensor layer 4.

The first groove portion 17 is connected to a first scraping portion 20 provided at the one end portion of the sensor layer 4 in the lateral direction. The first scraping portion 20 has a scraped edge of the sensor layer 4 in the lateral direction at the side of the one end portion of the sensor layer 4 in the longitudinal direction. The other end portion of the first scraping portion 20 in the longitudinal direction of the sensor layer 4 is connected smoothly and continuously with the one end portion of the first groove portion 17 in the lateral direction of the sensor layer 4.

The third groove portion 19 is connected to a second scraping portion 21 provided at the one end portion of the sensor layer 4 in the lateral direction. The second scraping portion 21 has a scraped edge of the sensor layer 4 in the lateral direction at the side of the other end portion of the sensor layer 4 in the longitudinal direction. The one end portion of the second scraping portion 21 in the longitudinal direction of the sensor layer 4 is connected smoothly and continuously with the one end portion of the third groove portion 19 in the lateral direction of the sensor layer 4.

The groove 8 is formed more to the other end side in the sensor layer 4 lateral direction than the groove 7. The groove 8 includes a first groove portion 22, a second groove portion 23, a third groove portion 24, a fourth groove portion 25, a fifth groove portion 26, a sixth groove portion 27, a seventh groove portion 28, an eighth groove portion 29, and a ninth groove portion 30. The first groove portion 22 extends from the one end portion of the sensor layer 4 in the longitudinal direction toward the other end portion of the sensor layer 4 in the longitudinal direction. The second groove portion 23 extends from the other end portion of the first groove portion 22 in the longitudinal direction of the sensor layer 4 toward the one end portion of the sensor layer 4 in the lateral direction. The third groove portion 24 extends from the one end portion of the second groove portion 23 in the lateral direction of the sensor layer 4 toward the other end portion of the sensor layer 4 in the longitudinal direction. The fourth groove portion 25 extends to be sloped toward the other end portion of the sensor layer 4 in the longitudinal direction as approaching the other end portion of the sensor layer 4 in the lateral direction from the other end portion of the third groove portion 24 in the longitudinal direction of the sensor layer 4. The fifth groove portion 26 extends from the other end portion of the fourth groove portion 25 in the lateral direction of the sensor layer 4 toward the other end portion of the sensor layer 4 in the longitudinal direction. The sixth groove portion 27 extends to be sloped toward the other end portion of the sensor layer 4 in the longitudinal direction as approaching the one end portion of the sensor layer 4 in the lateral direction from the other end portion of the fifth groove portion 26 in the longitudinal direction of the sensor layer 4. The seventh groove portion 28 extends from the one end portion of the sixth groove portion 27 in the lateral direction of the sensor layer 4 toward the other end portion of the sensor layer 4 in the longitudinal direction. The eighth groove portion 29 extends from the other end portion of the seventh groove portion 28 in the longitudinal direction of the sensor layer 4 toward the other end portion of the sensor layer 4 in the lateral direction. The ninth groove portion 30 extends from the other end portion of the eighth groove portion 29 in the lateral direction of the sensor layer 4 toward the other end portion of the sensor layer 4 in the longitudinal direction. The first groove portion 22 is opened toward the one end portion of the sensor layer 4 in the longitudinal direction. The ninth groove portion 30 is opened toward the other end portion of the sensor layer 4 in the longitudinal direction. The fifth groove portion 26 has a gap between the fifth groove portion 26 and the second groove portion 18 of the groove 7.

The groove 9 is provided closer to the other end portion of the sensor layer 4 in the lateral direction than the groove 8. The groove 9 includes a first groove portion 31, a second groove portion 32, a third groove portion 33, and a fourth groove portion 34. The first groove portion 31 extends from the one end portion of the sensor layer 4 in the longitudinal direction toward the other end portion of the sensor layer 4 in the longitudinal direction. The second groove portion 32 and the third groove portion 33 each branch from the other end portion of the first groove portion 31 in the longitudinal direction of the sensor layer 4. The fourth groove portion 34 connects the second groove portion 32 and the third groove portion 33 with each other. The second groove portion 32 extends to be sloped toward the other end portion of the sensor layer 4 in the longitudinal direction as approaching the one end portion of the sensor layer 4 in the lateral direction from the other end portion of the first groove portion 31 in the longitudinal direction of the sensor layer 4. The third groove portion 33 extends from the other end portion of the first groove portion 31 in the longitudinal direction of the sensor layer 4 toward the other end portion of the sensor layer 4 in the longitudinal direction, and further extends to be sloped toward the other end portion of the sensor layer 4 in the longitudinal direction as approaching the one end portion of the sensor layer 4 in the lateral direction. The fourth groove portion 34 connects the one end portion of the second groove portion 32 in the lateral direction of the sensor layer 4 and the one end portion of the third groove portion 33 in the lateral direction of the sensor layer 4 with each other. It should be noted that the first groove portion 31 is opened toward the one end portion of the sensor layer 4 in the longitudinal direction.

The groove 10 surrounds the groove 9. The groove 10 includes a first groove portion 35, a second groove portion 36, a third groove portion 37, a fourth groove portion 38, and a fifth groove portion 39. The first groove portion 35 extends toward the other end portion of the sensor layer 4 in the longitudinal direction from the one end portion of the sensor layer 4 in the longitudinal direction. The second groove portion 36 extends to be sloped toward the other end portion of the sensor layer 4 in the longitudinal direction as approaching the one end portion of the sensor layer 4 in the lateral direction from the other end portion of the first groove portion 35 in the longitudinal direction of the sensor layer 4. The third groove portion 37 extends from the one end portion of the second groove portion 36 in the lateral direction of the sensor layer 4 toward the other end portion of the sensor layer 4 in the longitudinal direction. The fourth groove portion 38 extends to be sloped toward the one end portion of the sensor layer 4 in the longitudinal direction as approaching the other end portion of the sensor layer 4 in the lateral direction from the other end portion of the third groove portion 37 in the longitudinal direction of the sensor layer 4. The fifth groove portion 39 extends from the other end portion of the fourth groove portion 38 in the lateral direction of the sensor layer 4 toward the one end portion of the sensor layer 4 in the longitudinal direction. The first groove portion 35 and the fifth groove portion 39 are each opened toward the one end portion of the sensor layer 4 in the longitudinal direction. The third groove portion 37 has a gap between the third groove portion 37 and the fourth groove portion 34 of the groove 9. It should be noted that, in the first embodiment, the one end portion of the first groove portion 35 of the groove 10 in the longitudinal direction of the sensor layer 4 and the first groove portion 22 of the groove 8 are common to each other.

The groove 11 is provided closer to the other end portion of the sensor layer 4 in the lateral direction than the groove 9. The groove 11 includes a first groove portion 40, a second groove portion 41, a third groove portion 42, and a fourth groove portion 43. The first groove portion 40 extends from the one end portion of the sensor layer 4 in the longitudinal direction toward the other end portion of the sensor layer 4 in the longitudinal direction. The second groove portion 41 and the third groove portion 42 each branch from the other end portion of the first groove portion 40 in the longitudinal direction of the sensor layer 4. The fourth groove portion 43 connects the second groove portion 41 and the third groove portion 42 with each other. The second groove portion 41 extends to be sloped toward the other end portion of the sensor layer 4 in the longitudinal direction as approaching the one end portion of the sensor layer 4 in the lateral direction from the other end portion of the first groove portion 40 in the longitudinal direction of the sensor layer 4. The third groove portion 42 extends from the other end portion of the first groove portion 40 in the longitudinal direction of the sensor layer 4 toward the other end portion of the sensor layer 4 in the longitudinal direction, and further extends to be sloped toward the other end portion of the sensor layer 4 in the longitudinal direction as approaching the one end portion of the sensor layer 4 in the lateral direction. The fourth groove portion 43 connects the one end portion of the second groove portion 41 in the lateral direction of the sensor layer 4 and the one end portion of the third groove portion 42 in the lateral direction of the sensor layer 4 with each other. It should be noted that the first groove portion 40 is opened toward the one end portion of the sensor layer 4 in the longitudinal direction.

The groove 12 surrounds the groove 11. The groove 12 includes a first groove portion 44, a second groove portion 45, a third groove portion 46, and a fourth groove portion 47. The first groove portion 44 extends from the one end portion of the sensor layer 4 in the longitudinal direction toward the other end portion of the sensor layer 4 in the longitudinal direction. The second groove portion 45 extends to be sloped toward the other end portion of the sensor layer 4 in the longitudinal direction as approaching the one end portion of the sensor layer 4 in the lateral direction from the other end portion of the first groove portion 44 in the longitudinal direction of the sensor layer 4. The third groove portion 46 extends from the one end portion of the second groove portion 45 in the lateral direction of the sensor layer 4 toward the other end portion of the sensor layer 4 in the longitudinal direction. The fourth groove portion 47 extends to be sloped toward the one end portion of the sensor layer 4 in the longitudinal direction as approaching the other end portion of the sensor layer 4 in the lateral direction from the other end portion of the third groove portion 46 in the longitudinal direction of the sensor layer 4. The first groove portion 44 is opened toward the one end portion of the sensor layer 4 in the longitudinal direction. The fourth groove portion 47 is connected to a third scraping portion 48 provided at the other end portion of the sensor layer 4 in the lateral direction. The third scraping portion 48 has a scraped edge of the sensor layer 4 in the lateral direction at the side of the one end portion of the sensor layer 4 in the longitudinal direction. The other end portion of the third scraping portion 48 in the longitudinal direction of the sensor layer 4 is connected smoothly and continuously with the other end portion of the fourth groove portion 47 in the lateral direction of the sensor layer 4. It should be noted that, in the first embodiment, the one end portion of the first groove portion 44 of the groove 12 in the longitudinal direction of the sensor layer 4 and the fifth groove portion 39 of the groove 10 are common to each other.

The groove 13 is provided closer to the other end portion of the sensor layer 4 in the lateral direction than the groove 8. The groove 13 includes a first groove portion 49, a second groove portion 50, a third groove portion 51, and a fourth groove portion 52. The first groove portion 49 extends from the other end portion of the sensor layer 4 in the longitudinal direction toward the one end portion of the sensor layer 4 in the longitudinal direction. The second groove portion 50 and the third groove portion 51 each branch from the one end portion of the first groove portion 49 in the longitudinal direction of the sensor layer 4. The fourth groove portion 52 connects the second groove portion 50 and the third groove portion 51 with each other. The second groove portion 50 extends to be sloped toward the one end portion of the sensor layer 4 in the longitudinal direction as approaching the one end portion of the sensor layer 4 in the lateral direction from the one end portion of the first groove portion 49 in the longitudinal direction of the sensor layer 4. The third groove portion 51 extends from the one end portion of the first groove portion 49 in the longitudinal direction of the sensor layer 4 toward the one end portion of the sensor layer 4 in the longitudinal direction, and further extends to be sloped toward the one end portion of the sensor layer 4 in the longitudinal direction as approaching the one end portion of the sensor layer 4 in the lateral direction. The fourth groove portion 52 connects the one end portion of the second groove portion 50 in the lateral direction of the sensor layer 4 and the one end portion of the third groove portion 51 in the lateral direction of the sensor layer 4 with each other. It should be noted that the first groove portion 49 is opened toward the other end portion of the sensor layer 4 in the longitudinal direction.

The groove 14 surrounds the groove 13. The groove 14 includes a first groove portion 53, a second groove portion 54, a third groove portion 55, a fourth groove portion 56, and a fifth groove portion 57. The first groove portion 53 extends toward the one end portion of the sensor layer 4 in the longitudinal direction from the other end portion of the sensor layer 4 in the longitudinal direction. The second groove portion 54 extends to be sloped toward the one end portion of the sensor layer 4 in the longitudinal direction as approaching the one end portion of the sensor layer 4 in the lateral direction from the one end portion of the first groove portion 53 in the longitudinal direction of the sensor layer 4. The third groove portion 55 extends from the one end portion of the second groove portion 54 in the lateral direction of the sensor layer 4 toward the one end portion of the sensor layer 4 in the longitudinal direction. The fourth groove portion 56 extends to be sloped toward the other end portion of the sensor layer 4 in the longitudinal direction as approaching the other end portion of the sensor layer 4 in the lateral direction from the one end portion of the third groove portion 55 in the longitudinal direction of the sensor layer 4. The fifth groove portion 57 extends from the other end portion of the fourth groove portion 56 in the lateral direction of the sensor layer 4 toward the other end portion of the sensor layer 4 in the longitudinal direction. The first groove portion 53 and the fifth groove portion 57 are each opened toward the other end portion of the sensor layer 4 in the longitudinal direction. The third groove portion 55 has a gap between the third groove portion 55 and the fourth groove portion 52 of the groove 13. It should be noted that, in the first embodiment, the other end portion of the first groove portion 53 of the groove 14 in the longitudinal direction of the sensor layer 4 and the ninth groove portion 30 of the groove 8 are common to each other.

The groove 15 is provided closer to the other end portion of the sensor layer 4 in the lateral direction than the groove 13. The groove 15 includes a first groove portion 58, a second groove portion 59, a third groove portion 60, and a fourth groove portion 61. The first groove portion 58 extends from the other end portion of the sensor layer 4 in the longitudinal direction toward the one end portion of the sensor layer 4 in the longitudinal direction. The second groove portion 59 and the third groove portion 60 each branch from the one end portion of the first groove portion 58 in the longitudinal direction of the sensor layer 4. The fourth groove portion 61 connects the second groove portion 59 and the third groove portion 60 with each other. The second groove portion 59 extends to be sloped toward the one end portion of the sensor layer 4 in the longitudinal direction as approaching the one end portion of the sensor layer 4 in the lateral direction from the one end portion of the first groove portion 58 in the longitudinal direction of the sensor layer 4. The third groove portion 60 extends from the one end portion of the first groove portion 58 in the longitudinal direction of the sensor layer 4 toward the one end portion of the sensor layer 4 in the longitudinal direction, and further extends to be sloped toward the one end portion of the sensor layer 4 in the longitudinal direction as approaching the one end portion of the sensor layer 4 in the lateral direction. The fourth groove portion 61 connects the one end portion of the second groove portion 59 in the lateral direction of the sensor layer 4 and the one end portion of the third groove portion 60 in the lateral direction of the sensor layer 4 with each other. It should be noted that the first groove portion 58 is opened toward the other end portion of the sensor layer 4 in the longitudinal direction.

The groove 16 surrounds the groove 15. The groove 16 includes a first groove portion 62, a second groove portion 63, a third groove portion 64, and a fourth groove portion 65. The first groove portion 62 extends from the other end portion of the sensor layer 4 in the longitudinal direction toward the one end portion of the sensor layer 4 in the longitudinal direction. The second groove portion 63 extends to be sloped toward the one end portion of the sensor layer 4 in the longitudinal direction as approaching the one end portion of the sensor layer 4 in the lateral direction from the one end portion of the first groove portion 62 in the longitudinal direction of the sensor layer 4. The third groove portion 64 extends from the one end portion of the second groove portion 63 in the lateral direction of the sensor layer 4 toward the one end portion of the sensor layer 4 in the longitudinal direction. The fourth groove portion 65 extends to be sloped toward the other end portion of the sensor layer 4 in the longitudinal direction as approaching the other end portion of the sensor layer 4 in the lateral direction from the one end portion of the third groove portion 64 in the longitudinal direction of the sensor layer 4. The first groove portion 62 is opened toward the other end portion of the sensor layer 4 in the longitudinal direction. The fourth groove portion 65 is connected to a fourth scraping portion 66 provided at the other end portion of the sensor layer 4 in the lateral direction. The fourth scraping portion 66 has a scraped edge of the sensor layer 4 in the lateral direction at the side of the other end portion of the sensor layer 4 in the longitudinal direction. The one end portion of the fourth scraping portion 66 in the longitudinal direction of the sensor layer 4 is connected smoothly and continuously with the other end portion of the fourth groove portion 65 in the lateral direction of the sensor layer 4. It should be noted that, in the first embodiment, the other end portion of the first groove portion 62 of the groove 16 in the longitudinal direction of the sensor layer 4 and the fifth groove portion 57 of the groove 14 are common to each other.

Providing the grooves 7 to 16 in this way allows the sensor layer 4 to be partitioned into a plurality of regions. More specifically, the sensor layer 4 includes a first region 67 surrounded by the groove 7, a second region 68 having the groove 7 and the groove 8 as its boundaries, a third region 69 surrounded by the grooves 8, 10, 12, 14 and 16, a fourth region 70 provided between the groove 9 and the groove 10, a fifth region 71 surrounded by the second groove portion 32, the third groove portion 33, and the fourth groove portion 34 of the groove 9, a sixth region 72 provided between the groove 11 and the groove 12, a seventh region 73 surrounded by the second groove portion 41, the third groove portion 42, and the fourth groove portion 43 of the groove 11, an eighth region 74 provided between the groove 13 and the groove 14, a ninth region 75 surrounded by the second groove portion 50, the third groove portion 51, and the fourth groove portion 52 of the groove 13, a tenth region 76 provided between the groove 15 and the groove 16, and an eleventh region 77 surrounded by the second groove portion 59, the third groove portion 60, and the fourth groove portion 61 of the groove 15. Among these regions, the second region 68, the fourth region 70, the sixth region 72, the eighth region 74, and the tenth region 76 each correspond to a sensor region, and the first region 67, the third region 69, the fifth region 71, the seventh region 73, the ninth region 75, and the eleventh region 77 each correspond to a non-sensor region. In the first embodiment, the sensor layer 4 is provided in line symmetry with the line passing through the middle portion of the sensor layer 4 in the longitudinal direction as the axis of symmetry.

The second region 68 is a sensor region, and includes a sensor unit 78 that receives pressure, and a lead wire connecting portion 79 to which a lead wire (not shown) is connected. In the second region 68, a portion provided between the second groove portion 18 of the groove 7 and the fifth groove portion 26 of the groove 8 corresponds to the sensor unit 78, and a portion connected to each of both ends of the sensor unit 78 in the longitudinal direction of the sensor layer 4 corresponds to the lead wire connecting portion 79. One edge of the lead wire connecting portion 79 in the longitudinal direction of the sensor layer 4 located at the one end of the sensor layer 4 in the longitudinal direction is an open edge exposed to the outside. On the other hand, the other edge of the lead wire connecting portion 79 in the longitudinal direction of the sensor layer 4 located at the other end of the sensor layer 4 in the longitudinal direction is an open edge exposed to the outside. Such a configuration as above serves as a strain gauge such that it is possible to detect the pressure applied to the gear 2 in which the thin film sensor 1 is provided. More specifically, when the sensor unit 78 is deformed by a force being applied to the sensor unit 78, the deformation is detected as an electrical signal.

Similarly to the second region 68, the fourth region 70 includes a sensor unit 80 and a lead wire connecting portion 81. In the fourth region 70, a portion provided between the fourth groove portion 34 of the groove 9 and the third groove portion 37 of the groove 10 corresponds to the sensor unit 80, and a portion connected to each of both ends of the sensor unit 80 in the longitudinal direction of the sensor layer 4 corresponds to the lead wire connecting portion 81. One edge of the lead wire connecting portion 81 in the longitudinal direction of the sensor layer 4 is an open edge exposed to the outside. It should be noted that the pressure detection in the fourth region 70 is performed in the same manner as that in the second region 68.

Similarly to the second region 68, the sixth region 72 includes a sensor unit 82 and a lead wire connecting portion 83. In the sixth region 72, a portion provided between the fourth groove portion 43 of the groove 11 and the third groove portion 46 of the groove 12 corresponds to the sensor unit 82, and a portion connected to each of both ends of the sensor unit 82 in the longitudinal direction of the sensor layer 4 corresponds to the lead wire connecting portion 83. One edge of the lead wire connecting portion 83 in the longitudinal direction of the sensor layer 4 is an open edge exposed to the outside. It should be noted that the pressure detection in the sixth region 72 is performed in the same manner as that in the second region 68.

Similarly to the second region 68, the eighth region 74 includes a sensor unit 84 and a lead wire connecting portion 85. In the eighth region 74, a portion provided between the fourth groove portion 52 of the groove 13 and the third groove portion 55 of the groove 14 corresponds to the sensor unit 84, and a portion connected to each of both ends of the sensor unit 84 in the longitudinal direction of the sensor layer 4 corresponds to the lead wire connecting portion 85. The other edge of the lead wire connecting portion 85 in the longitudinal direction of the sensor layer 4 is an open edge exposed to the outside. It should be noted that the pressure detection in the eighth region 74 is performed in the same manner as that in the second region 68.

Similarly to the second region 68, the tenth region 76 includes a sensor unit 86 and a lead wire connecting portion 87. In the tenth region 76, a portion provided between the fourth groove portion 61 of the groove 15 and the third groove portion 64 of the groove 16 corresponds to the sensor unit 86, and a portion connected to each of both ends of the sensor unit 86 in the longitudinal direction of the sensor layer 4 corresponds to the lead wire connecting portion 87. The other edge of the lead wire connecting portion 87 in the longitudinal direction of the sensor layer 4 is an open edge exposed to the outside. It should be noted that the pressure detection in the tenth region 76 is performed in the same manner as that in the second region 68.

The protective layer 5 is a layer protecting the sensor layer 4. The protective layer 5 has a substantially rectangular plate shape when viewed from above, and is provided on the sensor layer 4. At this time, the protective layer 5 is provided on the sensor layer 4 such that the longitudinal direction of the protective layer 5 is along the longitudinal direction of the sensor layer 4. Upon the protective layer 5 is provided on the sensor layer 4, for example, sputtering is used. It should be noted that the protective layer 5 is made of, for example, diamond-like carbon.

When the thin film sensor 1 of the first embodiment is provided on the tooth surface of the gear 2, the insulating layer 3 is initially formed on the tooth surface, following which the sensor layer 4 is formed. Thereafter, the grooves 7 to 16 are formed in the sensor layer 4 by irradiation of the laser, thereby partitioning the sensor regions. At this time, the grooves 7 to 16 are preferably formed by irradiating the surface of the sensor layer 4 with a laser beam of picosecond or less. After the grooves 7 to 16 are formed in the sensor layer 4, the protective layer 5 is formed on the sensor layer 4. Thus, according to the thin film sensor 1 of the first embodiment, since the sensor regions are partitioned by the formation of the groove 6 by irradiation of the laser, it is possible to directly manufacture the sensor 1 easily even on a curved surface or in a recessed portion. Furthermore, according to the thin film sensor 1 of the first embodiment, since the groove 6 is formed by irradiating the sensor layer 4 with a laser of picosecond or less, burrs during the formation of the groove 6 can be reduced or prevented from occurring.

Figure 4:
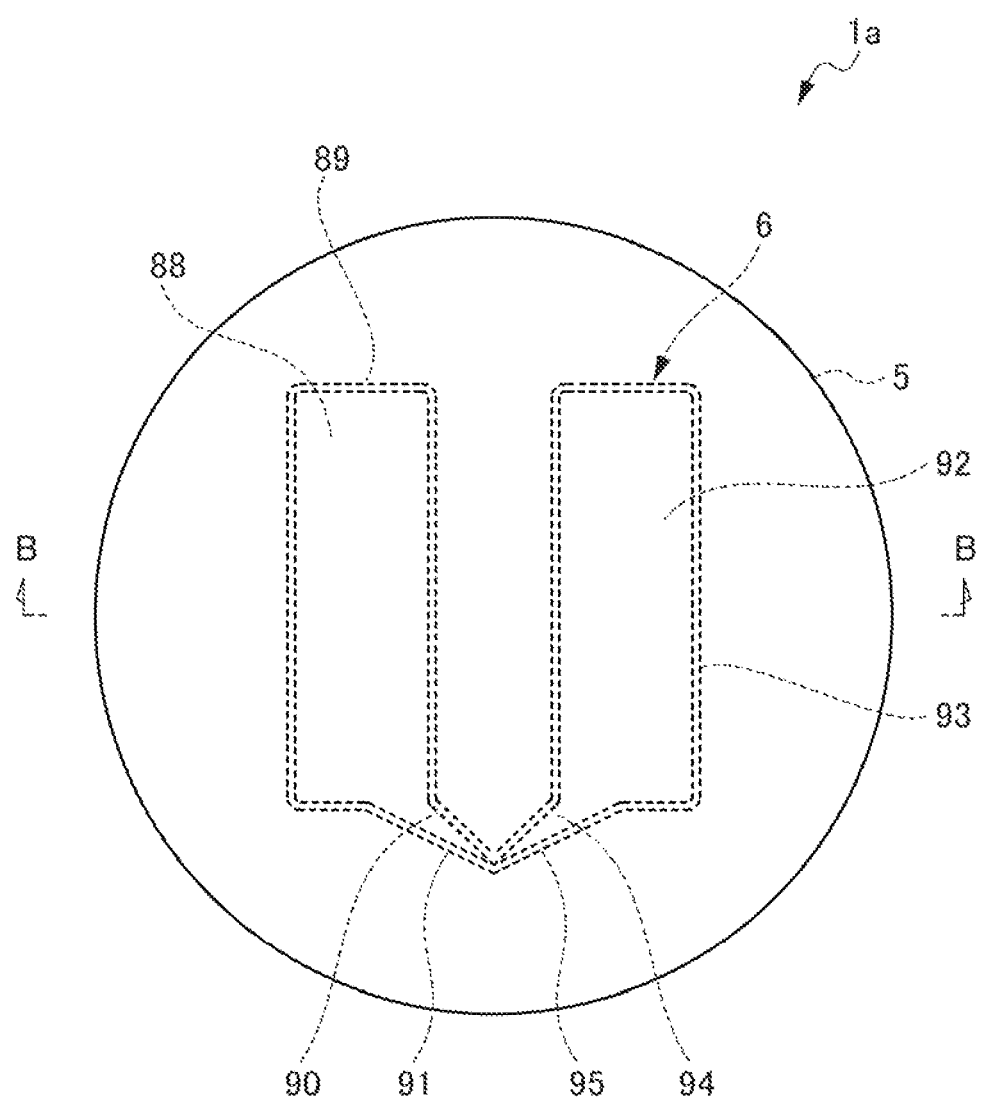
FIG. 4 is a schematic top view showing a thin film sensor according to a second embodiment of the present invention.
Figure 5:
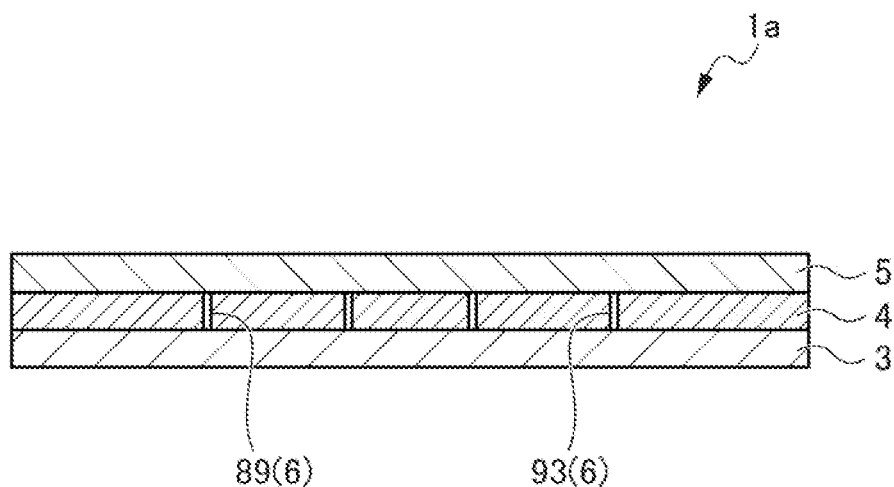
FIG. 5 is a cross-sectional view taken along the line B-B in FIG. 4.

FIGS. 4 and 5 are diagrams showing a thin film sensor according to a second embodiment of the present invention. FIG. 4 is a schematic top view, and FIG. 5 is a cross-sectional view taken along the line B-B in FIG. 4. It should be noted that, in the second embodiment, the feature portion thereof will be described, and explanations will be omitted for matters described in the first embodiment.

In the first embodiment, the thin film sensor 1 is a pressure sensor; whereas, in the second embodiment, the thin film sensor 1 is a temperature sensor. In this case as well, similarly to the first embodiment, a thin film sensor 1a includes an insulating layer 3, a sensor layer 4, and a protective layer 5. The insulating layer 3 and the protective layer 5 are made of the same materials as in the first embodiment by sputtering as in the first embodiment.

The sensor layer 4 is formed by, for example, sputtering. The sensor layer 4 includes a plurality of regions partitioned by grooves 6 that are formed by irradiation of the laser, and penetrate in the thickness direction. Among the plurality of regions, at least one region corresponds to a sensor region that senses the temperature of the gear 2, the other regions each correspond to a non-sensor region that does not sense the temperature of the gear 2. The details are as follows.

In the second embodiment, the groove 6 is formed in a continuous line in the sensor layer 4. The groove 6 includes a first groove portion 89, a second groove portion 91, a third groove portion 93, and a fourth groove portion 95. The first groove portion 89 partitions a first region 88 having a substantially rectangular shape when viewed from the top. The second groove portion 91 partitions a second region 90 that has a substantially triangular shape and is connected to the first region 88. The third groove portion 93 partitions a third region 92 having a substantially rectangular shape when viewed from the top. The fourth groove portion 95 partitions a fourth region 94 that has a substantially triangular shape when viewed from the top and is connected to the third region 92.

As shown in FIG. 4, the first region 88 and the third region 92 are spaced apart from each other. At this time, the first region 88 and the third region 92 are spaced apart from each other so that the long side portion of the first region 88 and the long side portion of the third region 92 correspond to each other. The second region 90 and the fourth region 94 extend in a triangular shape so as to be close to each other from one end in the longitudinal direction of the first region 88 and the third region 92, respectively. At this time, the distal end portion of the second region 90 and the distal end portion of the fourth region 94 are connected to each other. The groove 6 including the first groove portion 89 to the fourth groove portion 95 is formed in a continuous line in the sensor layer 4 such that the sensor region formed with the first region 88 to the fourth region 94 is partitioned.

In the second embodiment, the region surrounded by the groove 6 corresponds to a sensor region. That is, the sensor region is an inner region with the groove 6 as a boundary, and includes the first region 88, the second region 90, the third region 92, and the fourth region 94. Among the sensor regions, the first region 88 and the second region 90 are made of alumel, and the third region 92 and the fourth region 94 are made of chromel. Therefore, the sensor layer 4 has a portion made of alumel and a portion made of chromel. A lead wire (not shown) is connected to each of the first region 88 and the third region 92 of the sensor region. With the above configuration, it is possible to detect the temperature using the Seebeck effect.

It should be noted that the present invention is not limited to each of the above embodiments, and variations and improvements within a scope achieving the object of the present invention are included in the present invention.

For example, in each of the embodiments described above, the groove 6 is formed by irradiating the surface of the sensor layer 4 with a laser beam of picosecond or less; however, the present invention is not limited thereto. For example, grooves may be formed by a nanosecond laser which allows burrs to easily occur during irradiation of the laser. In this case, the groove is formed by irradiating the surface of the sensor layer with a laser with the surface of the sensor layer cooled. Thus, when forming a groove using a semiconductor laser with which burrs are likely to occur, it is possible to reduce or prevent burrs from occurring. In each of the above embodiments, the shape of the sensor region can be appropriately changed. That is, the groove is appropriately formed in the sensor layer 4.

EXPLANATION OF REFERENCE NUMERALS

1,1a thin film sensor
2 measurement target
3 insulating layer
4 sensor layer
6 groove

What is claimed is:

1. A thin film sensor comprising:
an insulating layer provided on a surface of a measurement target; and
a sensor layer that is laminated on the insulating layer, and includes a plurality of regions partitioned by a groove that is provided by irradiation of a laser and penetrates in a thickness direction,
wherein the groove includes a bottom portion, which is the insulating layer,
among the plurality of regions, at least one region corresponds to a sensor region that senses a pressure applied to the measurement target or a temperature of the measurement target, and other regions each correspond to a non-sensor region that does not sense a pressure applied to the measurement target or a temperature of the measurement target.

2. The thin film sensor according to claim 1, wherein the groove is provided by irradiating a surface of the sensor layer with a laser beam of picosecond or less.

3. The thin film sensor according to claim 1, wherein the groove is provided by irradiating a surface of the sensor layer with a laser beam with the surface of the sensor layer cooled.

* * * * *